(12) United States Patent
Ando et al.

(10) Patent No.: US 8,390,799 B2
(45) Date of Patent: Mar. 5, 2013

(54) METHOD FOR MEASURING OPTICAL CHARACTERISTICS OF DIFFRACTION OPTICAL ELEMENT AND APPARATUS FOR MEASURING OPTICAL CHARACTERISTICS OF DIFFRACTION OPTICAL ELEMENT

(75) Inventors: Takamasa Ando, Osaka (JP); Tsuguhiro Korenaga, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/308,080

(22) Filed: Nov. 30, 2011

(65) Prior Publication Data

US 2012/0069327 A1 Mar. 22, 2012

Related U.S. Application Data

(62) Division of application No. 12/442,674, filed as application No. PCT/JP2007/074058 on Dec. 13, 2007, now Pat. No. 8,089,620.

(30) Foreign Application Priority Data

Dec. 14, 2006 (JP) .................................. 2006-336820

(51) Int. Cl.
*G01B 9/00* (2006.01)
(52) U.S. Cl. ...................................... 356/124; 356/124.5
(58) Field of Classification Search .......... 356/124–128, 356/521, 515; 250/237 G
See application file for complete search history.

(56) References Cited

U.S. PATENT DOCUMENTS

| 5,170,221 A | 12/1992 | Matsui et al. |
| 6,990,225 B2 | 1/2006 | Tanaka et al. |
| 2005/0128475 A1 | 6/2005 | Imura |

FOREIGN PATENT DOCUMENTS

| JP | 57-060243 | 4/1982 |
| JP | 04-048231 | 2/1992 |
| JP | 09-196813 | 7/1997 |
| JP | 2000-009587 | 1/2000 |
| JP | 2001-004491 | 1/2001 |
| JP | 2002-181657 | 6/2002 |
| JP | 2002-277349 | 9/2002 |
| JP | 2003-114166 | 4/2003 |

OTHER PUBLICATIONS

Korenaga, T. et al., "Diffraction grating lens array," SPIE vol. 6501, Jan. 30-Feb. 1, 2007.
United States Notice of Allowance issued in U.S. Appl. No. 12/442,674, mailed Sep. 30, 2011.
US Office Action issued in U.S. Appl. No. 13/308,097 dated Apr. 26, 2012.

*Primary Examiner* — Tri T Ton
(74) *Attorney, Agent, or Firm* — McDermott Will & Emery LLP

(57) ABSTRACT

A measurement method and an evaluating apparatus are provided which are capable of easily and accurately evaluating the light amount of a spot beam, the diffraction efficiency, and the intensity distribution in the optical axis direction by detecting even a weak diffracted beam in an arbitrary wavelength range converged by a diffraction optical element as an imaging lens.

10 Claims, 6 Drawing Sheets

METHOD FOR MEASURING OPTICAL CHARACTERISTICS OF DIFFRACTION OPTICAL ELEMENT AND APPARATUS FOR MEASURING OPTICAL CHARACTERISTICS OF DIFFRACTION OPTICAL ELEMENT

RELATED APPLICATIONS

This application is a Divisional Application of U.S. application Ser. No. 12/442,674, filed on Mar. 24, 2009, now U.S. Pat. No. 8,089,620, which is based on the U.S. National Phase under 35 U.S.C. §371 of International Application No. PCT/JP2007/074058, filed on Dec. 13, 2007, claiming priority of Japanese Patent Application No. 2006-336820, filed on Dec. 14, 2006, the entire contents of each of which are hereby incorporated by reference.

TECHNICAL FIELD

The present invention relates to a method for measuring optical characteristics of a diffraction optical element and an apparatus for measuring optical characteristics of a diffraction optical element.

BACKGROUND ART

Recently, optical elements utilizing an optical diffraction phenomenon are utilized in various fields. FIG. 10 shows a general diffraction optical element 122. The diffraction optical element 122 is formed by forming parallel grooves having a triangular wave cross-section in a flat plate. When light enters the diffraction optical element 122, the light is split into diffracted beams of the zero order, the first order, the second order, etc. A method of evaluating diffraction efficiency of a beam diffracted in each order will be described below in detail.

FIG. 11 is a diagram explaining the diffraction efficiency evaluation method called a knife-edge method. When laser light 121 enters the diffraction optical element 122, it is split into diffracted beams having different orders which are focused on corresponding points in the direction perpendicular to the optical axis. The image-forming spot beams are blocked and scanned at predetermined intervals with the use of a mask plate 123 such as a knife-like edge sufficiently longer and thinner than the spot diameter so that the intensity of a spot beam at each point through which the beam passes is measured by a photodetector 124. From the obtained intensity distribution, the intensity difference is calculated, and the diffraction efficiency in each order is calculated from the thus obtained difference.

Patent Document 1 discloses a diffraction efficiency measurement of a diffraction optical element with cocentric diffraction grooves configured to form image forming points of spot beams diffracted in orders on the same straight line. In this measurement method, laser light is paralleled by a collimator lens and is allowed to enter a diffraction optical element, and then, the beam converged by the diffraction optical element is magnified by and observed under a microscope. In so doing, the spot beams of the orders overlap with each other. However, a pinhole slit is disposed around the diffracted spot beams for eliminating unnecessary order beams to remove the influence thereof. Computation of the diffraction efficiency is carried out in such a manner that the amount of transmitted light is first measured with the diffraction optical element not set as an incident light amount, and then, each amount of the spot beams diffracted in the orders transmitted through the pinhole slit is obtained.

However, the above two methods involves the following problems.

The knife-edge method as a general diffraction efficiency evaluation method is applicable only to the case where a plurality of diffracted spot beams are formed alongside perpendicularly to the optical axis. The diffraction optical element with cocentric diffraction grooves cannot be evaluated by the knife-edge method because a plurality of diffracted spot beams are formed side by side along the optical axis.

Patent Document 1, which evaluates the diffraction optical element with cocentric grooves, uses laser light as a light source for evaluation, and is addressed to an optical pickup lens. Therefore, only the diffraction efficiency in a single wavelength can be evaluated. Further, Patent Document 1 premises laser light providing a sufficient light amount as the light source. Therefore, a light source having wavelengths ranging to some extent, which has less light amount than the laser light, cannot be measured by the method in Patent Document 1.

In addition, the method in Patent Document 1 uses the pinhole slit for removing the influence of the sport beams in unnecessary orders, which means that slits with various hole diameters must be prepared for addressing the spot diameters of the spot beams diffracted in various orders. It is ideal for accurate evaluation to make the slit sizes agree with the spot sizes. This imposes a limit on the evaluation using the pinhole slit. In the second embodiment in Patent Document 1, the amount of light passing through an aspheric lens, rather than a diffraction optical element, is obtained in advance as an incident light amount for obtaining the diffraction efficiency. However, this method requires to prepare an additional lens having the same effective diameter as that of the diffraction optical element, which is laborious.

Patent Document 1: Japanese Unexamined Patent Application Publication 09-196813

DISCLOSURE OF THE INVENTION

Problems that the Invention is to Solve

In addition, the method disclosed in Patent Document 1 is directed to optical pickup lenses, and is therefore much difficult to be applied to evaluation of a diffraction optical element used as an imaging lens. For evaluating a diffraction optical element used as an imaging lens, conventionally, no method has been presented other than a method in which an image of a chart drawn with parallel lines or a figure is formed through a diffraction optical element and the thus formed image is observed to find deformation or blurry of the lines or figures. In this method, it is difficult to obtain, as numerical data, information as to specific modification on the diffraction optical element, and accordingly, easy modification of the diffraction optical element cannot be achieved.

The present invention has been made for solving the above problems in evaluation of a diffraction optical element for imaging purpose, and its objective is to provide a measurement method and an evaluating apparatus capable of easily and accurately evaluating the light amount of a spot beam, the diffraction efficiency, and the intensity distribution in the optical axis direction by detecting even a weak diffracted beam in an arbitrary wavelength range converged by a diffraction optical element as an imaging lens.

Means for Solving the Problems

In order to attain the above object, a method for measuring optical characteristics of a diffraction optical element in accordance with the present invention includes: a filtering step of filtering light emitted from a white light source to obtain a beam in a specified wavelength range; a light entering step of allowing the beam in the specified wavelength range to enter an imaging lens composed of the diffraction optical element; a magnifying step of magnifying a spot beam as a result of convergence of the beam by the imaging lens; a projecting step of projecting the magnified spot beam on a photodetector having a plurality of pixels; and a distance changing step of changing a distance between the photodetector and the imaging lens in a direction of an optical axis of the spot beam, wherein in-plane intensity distribution of the spot beam in an plane perpendicular to the optical axis and axial-direction intensity distribution in the optical axis direction are measured by the photodetector.

In order to attain the above object, a apparatus for measuring optical characteristics of a diffraction optical element in accordance with the present invention includes: a white light source; a filter configured to take out a beam in a specified wavelength range from the white light source; a mount on which the diffraction optical element as an imaging lens is to be placed; an optical magnification member configured to magnify the beam in the specified wavelength range converged as a spot beam by the diffraction optical element; a photodetector having a plurality of pixels detecting intensity distribution of the magnified spot beam; and a distance changing member configured to change a distance between the photodetector and the imaging lens in an optical axis direction of the spot beam.

Advantages of the Invention

The present invention enables evaluation of the diffraction efficiency of a diffracted beam in an arbitrary wavelength range passing through and converged by a diffraction optical element as an imaging lens, and accordingly, speedy and easy evaluation of the diffraction optical element can be achieved.

INDEX OF REFERENCE NUMERALS

| 11 | white light source |
| 12 | wavelength band-pass filter |
| 13 | pinhole slit |
| 14 | collimator lens |
| 15 | diaphragm |
| 16 | diffraction optical element (to-be-tested lens) |
| 17 | spot beam |
| 20a | image by spot beam on CCD (reconverged spot beam) |
| 18 | microscope |
| 19 | CCD |
| 34 | evaluation area |
| 50 | mount |
| 51 | angle changing mechanism |
| 52 | optical axis |
| 54 | arithmetic unit |
| 56 | distance changing member |
| 62 | lens axis |
| 63 | rotation axis |
| 122 | general diffraction optical element |
| 121 | laser light |
| 123 | knife-like sharp blade |
| 124 | photodetector |

BEST MODE FOR CARRYING OUT THE INVENTION

Embodiments of the present invention will be described with reference to the accompanying drawings.

Embodiment 1

Figure 1:
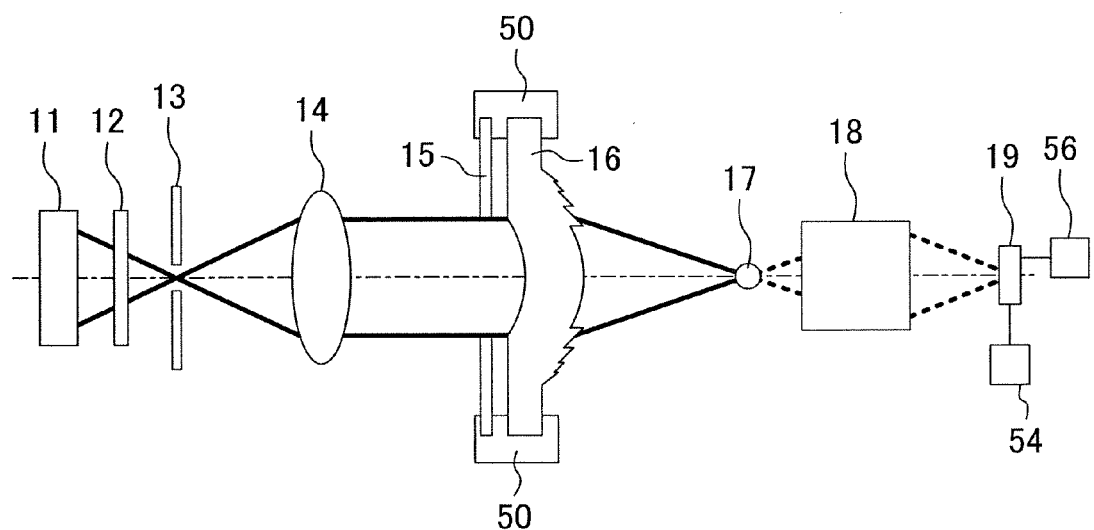
FIG. 1 is an illustration showing an apparatus for measuring a diffracted spot beam.
Figure 7:
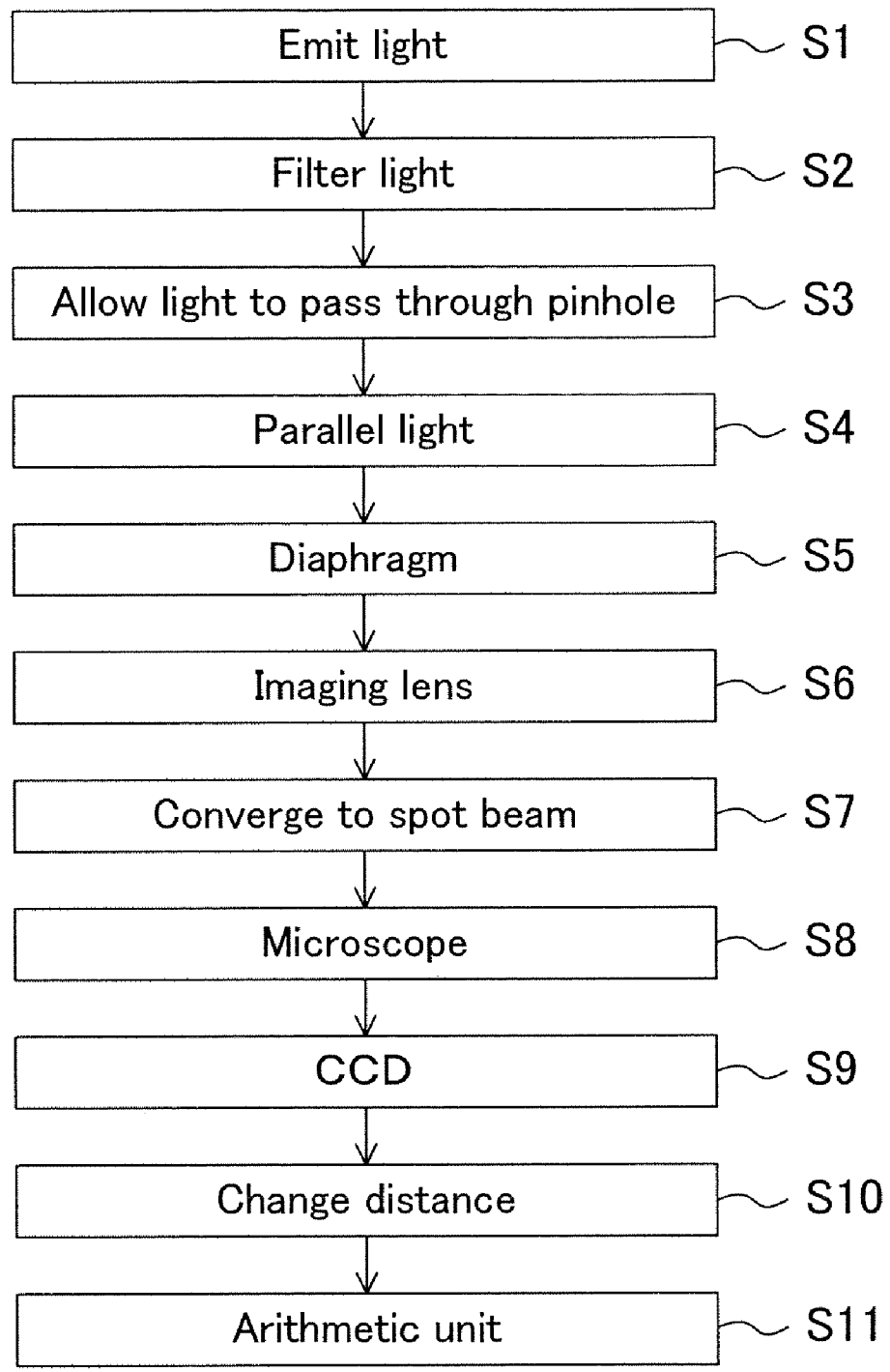
FIG. 7 is a flow chart for measuring a diffracted beam from a diffraction optical element.

FIG. 1 illustrates a measuring apparatus for evaluating optical characteristics of a spot beam of a diffraction optical element 16 (an imaging lens) with diffraction grooves in a cocentric ring structure. FIG. 7 is a flow chart depicting a method for measuring the optical characteristics of the diffraction optical element 16. The characteristics to be measured are the light amount, intensity distribution in the optical axis direction, intensity distribution in a plane perpendicular to the optical axis, and the like of a spot beam emitted from the diffraction optical element 16.

When white light emitted from a light source (a white light source) 11 passes through a wavelength band-pass filter 12, only light in any wavelength range is transmitted. These processes correspond to a white light emitting step S1 and a filtering step S2.

The transmitted light in the specified wavelength range is irradiated to a pinhole slit 13 to be diaphragmed (a first diaphragming step S3). The incident light from the pinhole slit 13 is paralleled by a collimator lens 14 (a collimating step S4), is diaphragmed by a diaphragm 15 (a second diaphragming step S5), and is allowed to enter the diffraction optical element 16 under test (a light entering step S6). The diffraction optical element 16 is mounted on a mount 50 and is fixed to the measuring apparatus.

The diffraction optical element 16 converges the incident light (a light converging step S7). In order to further accurately evaluate the converged image, that is, a spot beam 17, the spot beam 17 is magnified by the objective lens of a microscope 18 (a magnifying step S8), and is projected on a CCD 19 through the imaging lens of the microscope 18 to form an image again (a projecting step S9). In other words, magnification of the spot beam 17 by the microscope 18 means magnification of an image of light converged by the diffraction optical element 16. The distance between the microscope 18 and the CCD 19 is fixed at a set value defined by the microscope 18. Transmission of intensity information from the CCD 19 to a monitor, an arithmetic unit 54, or the like can achieve detailed evaluation of the amount of the spot beam, the in-plane intensity distribution in a plane perpendicular to the optical axis, the spot beam diameter, and the like (an evaluating step S11). The microscope 18 and the CCD 19 are moved integrally in the optical axis direction by a distance changing member 56, and the amount of the spot beam, the in-plane intensity distribution, and the spot diameter at each point on the optical axis direction are measured (a distance changing step S10). The magnification may be changed appropriately in the magnifying step S8. The evaluation will be described later in detail.

Herein, the light source 11 may use infrared light or UV light according to purpose. To do so, an appropriate light source 11 and a wavelength band-pass filter 12 must be prepared accordingly. The use of the wavelength band-pass filter 12 enables evaluation of the converged state of a spot beam in an arbitrary wavelength range ranging to some extent rather than spot beam evaluation in a single wavelength. Hence, the aberration of the diffraction optical element 16 which is caused due to ranging of the wavelength can be evaluated. The use of only a white light source as the light source 11 can eliminate the need to additionally prepare the wavelength band-pass filter 12 in evaluating the spot beam of the white light by the diffraction optical element 16.

Depending on the light source used, it is preferable to provide a filter for removing an unnecessary beam according to need, such as an IR cut filter or the like. Such filters may not necessarily be disposed between the light source 11 and the pinhole slit 13, and may be disposed between the diffraction optical element 16 and the microscope 18 or between the microscope 18 and the CCD 19.

The pinhole slit 13 corresponds to an object for the diffraction optical element 16. Accordingly, reduction in diameter of the pinhole slit 13 can lead to a configuration more approximate to a point light source if the incident light is sufficient. In reverse, the diameter of the pinhole slit 13 may be increased if the amount of the incident light is less.

The collimator lens 14 is used for virtually forming an infinity object by paralleling the incident light from the pinhole slit 13. In order to evaluate the image forming light of an object at arbitrary location, the collimator lens 14 is unnecessary, and the pinhole slit 13 is set at an appropriate point. The position of the diaphragm 15 of the diffraction optical element 16 is determined according to the optical design of the diffraction optical element 16. With any number of lenses and any number of diffraction planes, the same evaluation is possible.

Figure 2:
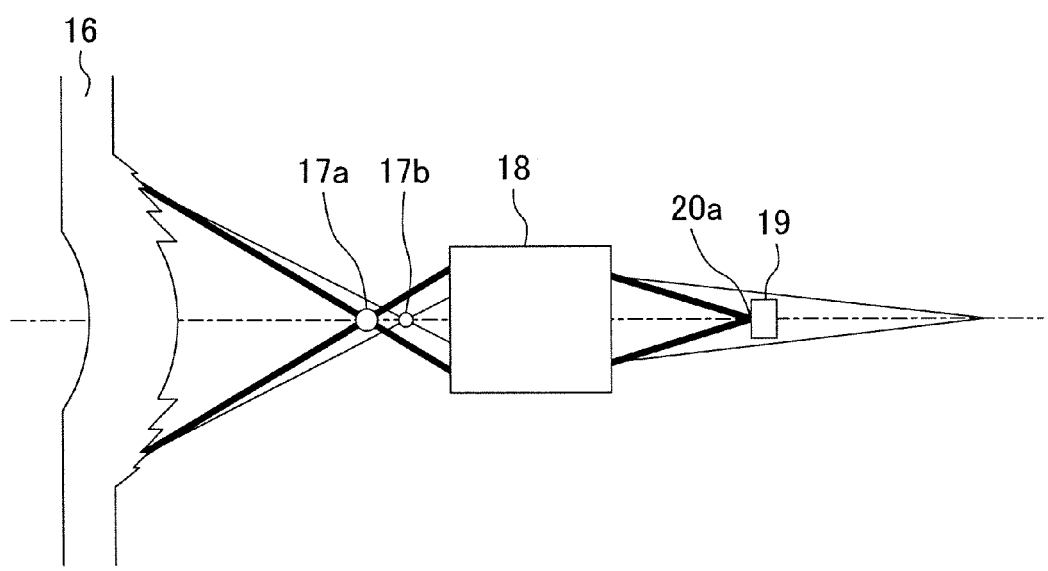
FIG. 2 is an illustration showing a method for measuring spot beams diffracted in respective orders.

A method for evaluating a spot beam diffracted in each order will be described with reference to FIG. 2.

The beam emitted from the diffraction optical element 16 is split to each order beam of the first-order beam and the zero-order beam, and the like, to be converged to the spot beam 17a and the zero-order spot beam 17b on the optical axis. The imaging lens utilizes the first-order beam in general. Accordingly, the microscope 18 is moved for magnifying the spot beam 17a of the to-be-evaluated first-order beam so as to form an image again on the CCD 19. In so doing, the CCD 19 is also moved together with the microscope 18 for keeping the magnification constant. The positions of the microscope 18 and the CCD 19 are determined in such a manner that an image on the moving CCD 19 is observed to find a point focused to some extent, and then, a point therearound where the intensity is maximum is found. Spot beams in the orders other than the spot beam 17a of the target first-order beam, for example, a spot beam 17b of the zero-order beam is not converged but expands on the CCD according to the position of the microscope 18, and is accordingly less influences measurement of the intensity and light amount of the spot beam 17a of the first-order beam. Actually, the spot beam 17b, which is also magnified by the microscope 18, is expanded enough to extend off the imaging area of the CCD 19, with a result that the influence on the intensity per one pixel of the CCD 19 is sufficiently small.

Figure 3:
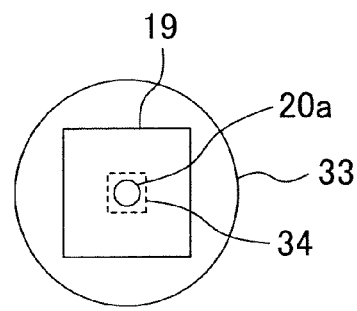
FIG. 3 is a diagram showing an image on a CCD.

FIG. 3 illustrates an image on the CCD 19. For evaluating the spot beam 17a of the target first-order beam, an evaluation area 34 may be set small so as to agree with the image (reconverged beam spot 20a) of the spot beam 17a of the first-order beam for suppressing the influence of the unnecessary zero-order diffracted beam 17a and the like as far as possible. In the reconverged beam spot 20a, the intensity of each point is measured by a plurality of pixels of the CCD 19. The in-plane intensity distribution is measured from the thus obtained measurement data. Herein, reference numeral 33 denotes an image of the zero-order beam on the CCD 19. Where the light amount of the spot beam 17a of the first-order beam is too small due to small light amount of the light source 11 to be detected by the CCD 19, the magnification of the microscope 18 is set low to increase the density of the reconverged spot beam 20a.

Ideally, the imaging lens utilizes a spot beam of a single order diffracted beam, and accordingly the light amounts of the spot beams of the other order beams must be minimized as far as possible. To do so, evaluation may be performed with the microscope 18 set at high magnification so that the details of the spot beam can be obtained only at evaluation of the spot beam of a required-order diffracted beam. While on the other hand, the magnification may be set low to an extent that evaluation is capable at evaluation of the other spot beams of minute unnecessary order diffracted beams.

Figure 4:
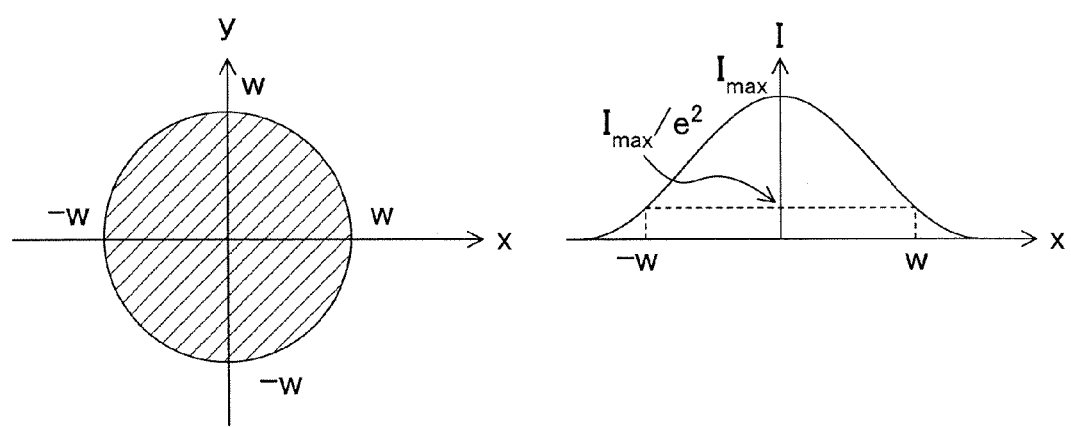
FIG. 4 is a graph of light amount distribution of the image (reconverged spot) on the CCD.

Next, a method for obtaining the light amount of the reconverged spot light 20a will be described with reference to FIG. 4. First, a maximum intensity $I_{max}$ is obtained which is the maximum intensity of intensities measured at all the pixels of the CCD 19 in the evaluation area 34. Given that the intensity distributions in x and y directions (two directions orthogonal to a plane perpendicular to the optical axis) of a reconverged beam spot 20a are Gaussian distributions, the light amount E of the reconverged beam spot 20a can be obtained by Equation 1. The light amount E herein is a total sum of the intensities at all the pixels on which the spot is projected. As indicated on the right side in FIG. 4, w is a radius of the reconverged beam spot 20a where an aggregation of pixels of which the intensity is equal to or greater than $I_{max}/e^2$ is judged as a spot.

[Equation 1]

$$E = \int_s I dS \qquad \text{Equation 1}$$
$$= \frac{\pi}{2}\left(1 - \frac{1}{e^2}\right) I_{max} w^2$$

wherein $$I(r) = I_{max} \exp\left(-\frac{2r^2}{w^2}\right)$$

Herein, I(r) is an intensity measured at a pixel of the CCD 19 located a radius r apart from the spot center.

The light amount E where the diffracted spot beam 17a is in an elliptic shape because the incident light enters obliquely or the like is obtained from the following Equation 2, wherein the radius in the long axis direction of the reconverged beam spot 20a is a and the radius in the short axis direction thereof is b.

[Equation 2]

$$I_s = \frac{\pi}{2}\left(1 - \frac{1}{e^2}\right) I_{max} ab \qquad \text{Equation 2}$$

Accordingly, once the maximum intensity and radius of the reconverged beam spot 20a are obtained, the light amount E of the reconverged beam spot 20a can be obtained readily. The maximum intensity and radius w of the reconverged beam spot 20a can be obtained easily from the intensity distribution data from the CCD 19 by image processing using a computer (the arithmetic unit 54) or the like.

In the case where the spot is deformed rather than a circle, the spot radius w may be average distance from the center of gravity to the edge of the spot. As another method for evaluating the light amount E, the intensities of all the pixels on which the spot is projected may be summed. In this case, the boundary of the spot may be determined using the value of $I_{max}/e^2$ as a threshold value as described above, or the intensities of all the pixels in the evaluation area, defined (to be a rectangular shape, for example) according to the spot size, may be summed.

When spot beam evaluation is likewise performed on the spot beams of all order diffracted beams, each diffraction efficiency of the spot beams of the order diffracted beams can be obtained as follows. A specific method for obtaining a diffraction efficiency may be division of the light amount of an order diffracted beam by the total sum of the light amounts of the respective observed diffracted spot beams as the amount of light entering the diffraction optical element 16. All the order diffracted spot beams herein means all the spot beams diffracted in the orders that the CCD 19 can detect.

When an antireflection film is attached to each plane surface of the to-be-tested lens (the diffraction optical element 16), further accurate diffraction efficiency of the diffraction optical element 16 can be obtained. The antireflection film may be attached by vapor deposition or the like.

When the intensities are measured at predetermined intervals by moving the CCD 19 in the z direction (the optical axis direction), continuous maximum intensity distribution in the z direction (the intensity distribution in the axial direction) can be evaluated. A graph of the optical axis z to the maximum intensity can facilitate judgment of each peak point of order beams and the relative scale of the light amounts. With this data, the presence or absence of unnecessary diffracted spot beam can be easily and instantly checked. Accordingly, this data is especially suitable for evaluation of a diffraction grating lens for imaging purpose. Checking of the peak sharpness of each spot beam can lead to evaluation of the convergence degree of the spot beam of each order diffracted beam. The peak sharpness may be defined by a Q value. The Q value is a value expressed by the following equation.

[Equation 3]

$$Q = \frac{z0}{z2 - z1} \qquad \text{Equation 3}$$

Here, z0 is a peak point in the optical axis direction; z1 is a point in the optical axis direction at which a value is a half of the peak intensity on the left side of the peak on the graph; z2 is a point in the optical axis direction at which a value is a half of the peak intensity on the right side of the peak on the graph. Wherein, z2>z1 is satisfied.

The wavelength band-pass filter 12 may be changed to other filters allowing beams in wavelengths in ranges different from the above range to pass therethrough for evaluation using each wavelength band-pass filter. Comparison of thus obtained results enables evaluation of the on-axis color aberration of the spot beams at the same time. In addition, the present method enables simultaneous comparison in on-axis color aberration between spots. However, this evaluation requires the magnification of the microscope 18 to be constant because the maximum intensity depends on the spot density. Further, the points where the diffracted spot beams form images are far enough from each other in many cases. Therefore, the moving distance in the z direction of the microscope 18 and the CCD 19 must be set to an extent capable of coping with every point of images formed by the diffracted beams.

The pixel pitch of the CCD 19 must be small enough relative to the spot radius w on the CCD 19. For example, it may be equal to or smaller than $\frac{1}{10}$ of the spot radius w, and is preferably $\frac{1}{50}$ or smaller. By setting so, 100 or more pixels are present in an image of the spot beam, thereby preventing interference of the diffracted beams in evaluation of the point z in the optical axis direction vs. the maximum intensity Imax.

As described above, according to the measurement method and the evaluating method in the present embodiment, when light enters a diffraction optical element as an imaging lens, measurements may be facilitated of the image forming point in the optical axis direction, maximum intensity, light amount of the converged beam spot of each order beam formed the diffraction efficiency of each order beam, the in-plane intensity distribution of each plane perpendicular to the optical axis of the converged spot beams of each order beam, the peak sharpness of each converged beams, and the like. The measurement data can be stored and analyzed. Accordingly, when the actual data is compared with predicted optical characteristic values corresponding to the actual measurement data, such as the amount of each order converged beam and intensity distribution predicted by computation from the design data of a diffraction optical element, differences between the design values and the actual measurement values of each part of the lens are clarified, thereby leading to easy modification of the lens.

Embodiment 2

Figure 5:
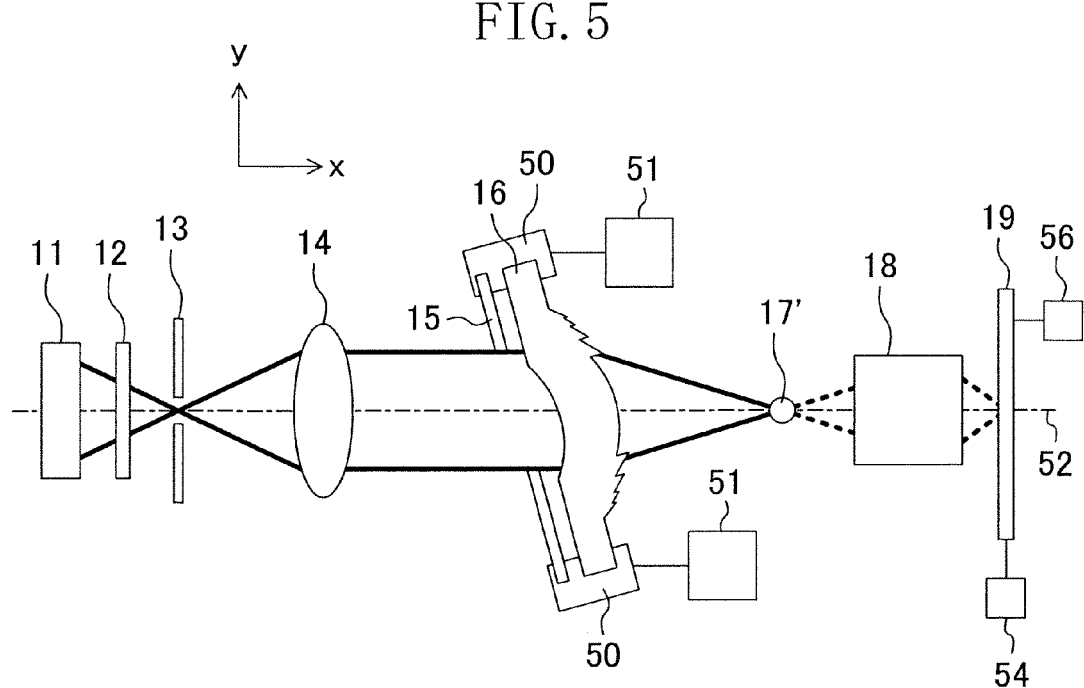
FIG. 5 is an illustration showing a method for evaluating a diffracted spot beam at oblique incidence.

FIG. 5 shows an apparatus for measuring a diffracted beam of the diffraction optical element 16 in accordance with Embodiment 2. This apparatus includes an angle changing mechanism 51 in addition to the aforementioned components in FIG. 1, and the measurement method includes an angle changing step. Whereby, the angle of the incident light entering the diffraction optical element 16 can be changed to allow evaluation of oblique incidence characteristics of the diffraction efficiency (optical characteristics according to the angle of view).

In the present embodiment, the angle changing mechanism 51 is mounted on the mount 50 on which the diffraction optical element 16 and the diaphragm 15 are disposed, and sets the angle formed between the optical axis of the diffraction optical element 16 and the optical axis 52 of the incident light with the use of three micrometers or the like orthogonal to one another. When the diffraction optical element 16 is inclined at an arbitrary angle by the angle changing mechanism 51 while a rotation angle meter or the like is checked, the diffraction efficiency in the oblique incidence at an arbitrary angle of view can be evaluated. The center of the diffraction optical element 16 (present on the optical axis of the element 16 itself) is on the optical axis 52 of the incident light, and the components of the apparatus other than the diffraction optical element 16 are arranged in parallel to a single straight line. The spot beams diffracted in the orders are converged on the same straight line. Hence, the microscope 18 and the CCD 19 can be controlled on the single axis in evaluating each order spot beam.

As the angle changing mechanism 51, a component other than the diffraction optical element 16 may be inclined. In this case, every component other than the diffraction optical element 16 may be inclined integrally. Alternatively, only components on the incident side, such as the light source 11, the wavelength band-pass filter 12, the pinhole slit 13, and the like may be inclined, while micrometers or the like capable of moving in the x, y, and z directions are provided in the microscope 18 or the CCD 19 to trace the spot beam 17'.

EXAMPLE

The present invention will be described further in detail by referring to examples. It is noted that the present invention is not limited to the following examples.

Example 1

The measurement apparatus used has the configuration shown in FIG. 1. A white light halogen light source, LA150FBU (a product of HAYASHI WATCH-WORKS, CO., LTD.) was used as the light source. Filters of three colors of R, G, and B appropriate for evaluation for imaging purpose were used as the wavelength band-pass filter. Each wavelength characteristics at an incident angle of 0 degree is as follows.

R filter: Wavelength $\lambda$=400 to 565 nm, Transmittance T$\leq$1%
Wavelength $\lambda$=610±10 nm, Transmittance T=50%
Wavelength $\lambda$=640 to 700 nm, Transmittance T$\geq$85%
(DIF-50S-Red by Sigma Koki Co., Ltd.)

G filter: Wavelength $\lambda$=400 to 460 nm, Transmittance T$\leq$1%
Wavelength $\lambda$=505±10 nm, Transmittance T=50%
Wavelength $\lambda$=575±10 nm, Transmittance T=50%
Wavelength $\lambda$=630 to 700 nm, Transmittance T$\leq$1%
(DIF-505-Gre by Sigma Koki Co., Ltd.)

B filter: Wavelength $\lambda$=400 to 470 nm, Transmittance T$\geq$85%
Wavelength $\lambda$=495±10 nm, Transmittance T=50%
Wavelength $\lambda$=530 to 700, nm Transmittance T$\leq$1%
(DIF-50E-BLE by SIGMA KOKI CO., LTD.)

In order to remove IR light in the light source, an IR cut filter (CLDF-50 by SIGMA KOKI CO., LTD.) was attached. The pinhole slit used had a hole $\Phi$ of 0.2 mm, and a collimator lens was used to allow a parallel beam to enter a diffraction optical element. Since the amount of light from the light source is smaller than that of the laser light, the magnification of the microscope was set at 50 times so that weak diffracted beam can be evaluated. As the CCD, a ½ type 380000-pixel color CCD was used. A rectangular area with which only a target spot beam agrees was specified as the evaluation area.

In obtaining the intensity, an intensity on the CCD was obtained in advance with no light from the light source allowed to enter for removing influence of external light and the like on the intensity, and the thus obtained intensity was offset (minimum value=0) as a minimum value.

Figure 8:
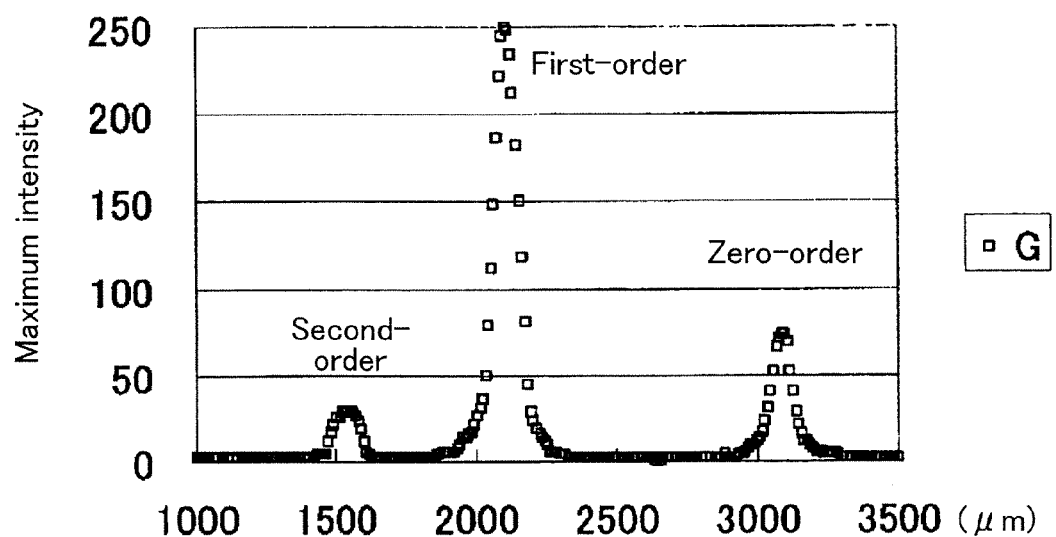
FIG. 8 is a graph of maximum intensity distribution where light passes through a G filter.

The microscope and the CCD were moved in the optical axis direction (the z direction), and the maximum intensity distribution of the spot beam in the z direction was measured. The result is shown in FIG. 8. FIG. 8 is an evaluation where the light in the wavelength range between approximately 505 and 575 nm was transmitted through a diffraction optical element with the use of the G filter, wherein the movement pitch in the z direction was 10 μm. The origin of z is the lens center of the last plane, which is adjusted by focusing the focal point of the microscope to the lens center. The axis of ordinates denotes the maximum intensity of the measured beam, which was normalized by the intensity of the first-order beam.

Three peaks of the diffracted spot beams were observed of the second-order beam, the first-order beam, and the zero-order beam from the left. From the spot diameters at the peak points, the light amounts of the diffracted spot beams can be obtained, and in turn, each diffraction efficiency of the diffracted beams can be obtained.

The blaze height of this diffraction optical element is higher than the desired value (the design value). Accordingly, the maximum intensity of the second-order beam is higher than that by an optical simulation of a diffraction optical element as designed, and the zero-order beam has a high maximum intensity because of a defect of shape transcription of the distal end of the blaze in the manufacturing process. Hence, the lens performance can be evaluated through this evaluation, thereby leading to development of a high quality lens. When the filters are changed, evaluation of the diffraction efficiencies in other wavelength ranges is enabled by the same method.

Figure 9:
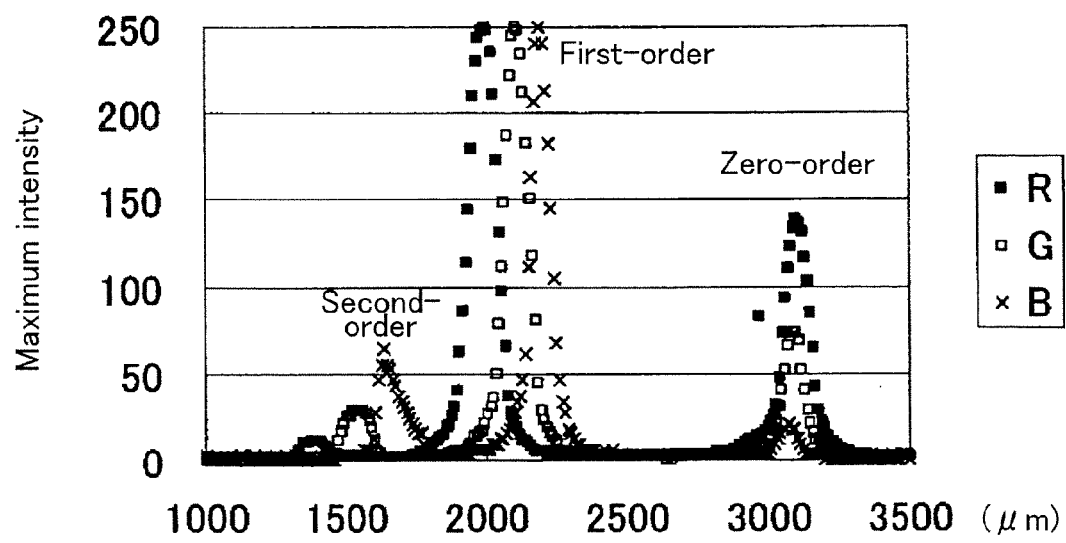
FIG. 9 presents graphs of maximum intensity distribution in respective wavelengths.
Figure 10:
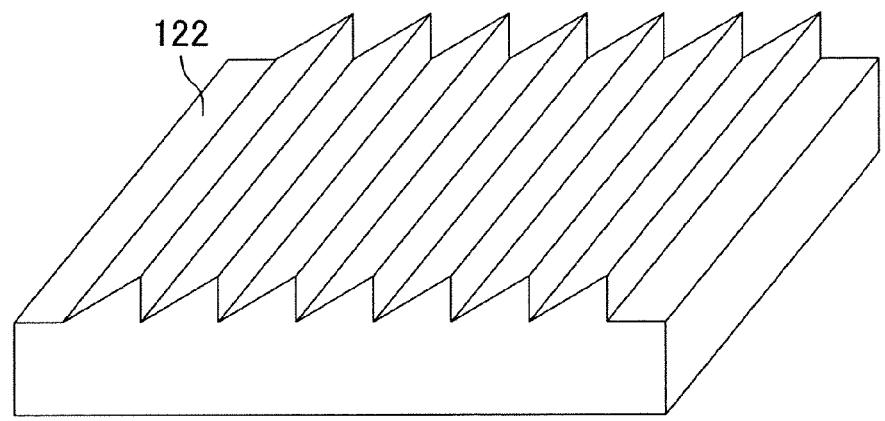
FIG. 10 is an illustration showing a general diffraction optical element.
Figure 11:
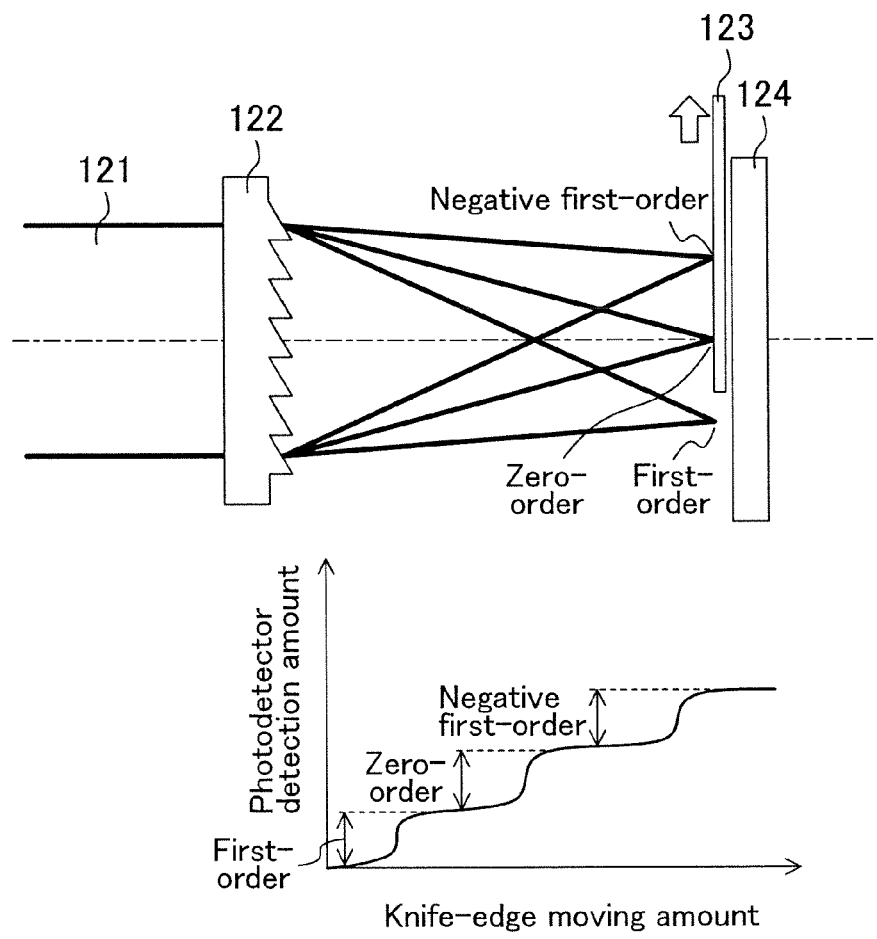
FIG. 11 is an illustration showing a conventional apparatus for measuring a diffracted beam from a diffraction optical element.

FIG. 9 presents graphs showing the maximum intensity distributions through the filters of R, G, and B. Differences in point where the image is formed according to difference in wavelength can be observed in each same-order. This is the on-axis color aberration. The present method enables easy comparison in color aberration between orders, thereby achieving speedy and readily apprehensible evaluation of the color aberration.

Example 2

Figure 6:
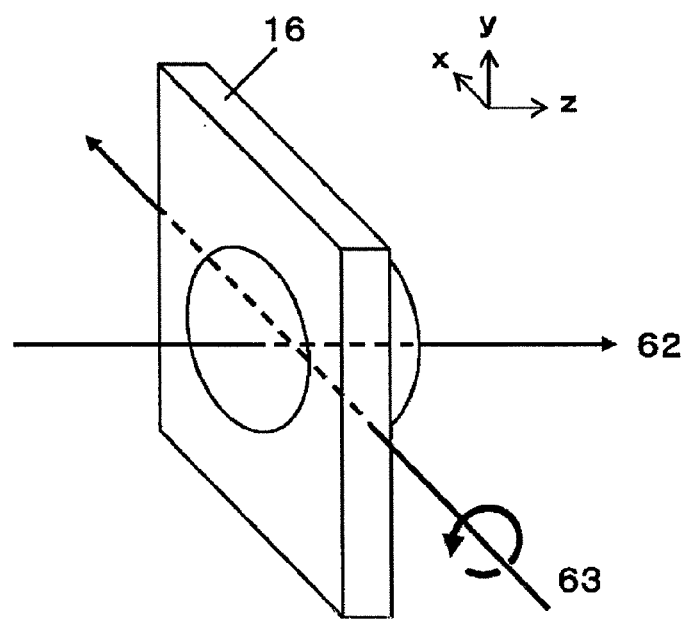
FIG. 6 is an illustration showing a lens center and a rotation axis.

In addition, in order to obtain the diffraction efficiency where the incident light enters obliquely, the angle changing mechanism 51 is mounted to the apparatus in Example 1 to have the same configuration as that shown in FIG. 5. As shown in FIG. 6, for evaluation at a desired angle, the center axis 62 of the diffraction optical element 16, the principal plane of the diffraction optical element 16, and the optical axis of the incident light may be adjusted so to meet at one point. In other words, the principal point of the diffraction optical element 16 is overlapped with the optical axis of the incident light flux. For this adjustment, micrometers capable of fine adjustment in the x, y, and z directions orthogonal to one another are added to the angle changing mechanism. This adjustment enables formation of the spot beam almost on the optical axis of the incident light even when the diffraction optical element 16 is inclined relative to the optical axis about the rotation axis 63 of the angle changing mechanism 51. Micrometers with a minimum scale of 10 μm were used as the micrometers x, y, z.

Setting the magnification of the microscope 18 small facilitates this adjustment. For example, it is set at ten times. Whereby, the spot beam at an arbitrary angle can be evaluated easily. The larger the angle of view is, the more largely the point of the spot beam on the CCD 19 is displaced from the center of the evaluation area 34. For this reason, fine adjustment by the micrometers is required as appropriate. Similarly to the evaluation in the perpendicular incidence, the spot beam 17 in each order of oblique incident light is evaluated with the microscope 18 and the CCD 19 moved on the same axis. This can also cause slight displacement, and accordingly, fine adjustment in the x and y directions may be carried out as appropriate. Reduction in magnification of the microscope 18 can facilitate this adjustment. It is possible to increase the magnification only in evaluating the spot beam.

INDUSTRIAL APPLICABILITY

The present invention enables speedy and highly-accurate evaluation of a diffraction optical element for imaging purpose, and is therefore useful as a method for evaluating diffraction optical elements for imaging purpose.

The invention claimed is:

1. A method for measuring optical characteristics of a diffraction optical element, the method comprising:
    a filtering step of filtering light emitted from a white light source with a band-pass filter, thereby obtaining a beam in a specified wavelength range;
    a light entering step of allowing the beam in the specified wavelength range to enter an imaging lens composed of the diffraction optical element;
    a magnifying step of magnifying a spot beam as a result of convergence of the beam by the imaging lens;
    a projecting step of projecting the magnified spot beam on a photodetector having a plurality of pixels;
    a measuring step of measuring an intensity of the projected magnified spot beam by using the photodetector while changing a distance between the photodetector and the imaging lens in a direction of an optical axis of the spot beam; and
    a profile obtaining step of obtaining an intensity variation of the projected magnified spot beam along the optical axis as a function of the distance, the intensity variation including at least two peaks corresponding to two different order diffraction lights.

2. The method of claim 1, further comprising:
    a step of comparing an obtained intensity variation when the specified wavelength range in the measuring step is a first range, with an obtained intensity variation when the specified wavelength range in the measuring step is a second range that is different from the first range.

3. The method of claim 1, further comprising:
    an identifying step of identifying at least one of (a) each peak point of each-order spot beams and (b) relative scale of light amounts of each-order spot beams, based on the obtained intensity variation; and
    a step of comparing the identified each peak point of each-order spot beams or relative scale of light amounts of each-order spot beams, based on the obtained intensity variation, with the one determined by using design data of the diffraction optical element.

4. The method of claim 1, wherein the specified wavelength range falls under one of the red wavelength range, the green wavelength range, and the blue wavelength range.

5. The method of claim 1, wherein, when changing the distance between the photodetector and the imaging lens, positions of the photodetector are changed at a predetermined interval.

6. The method of claim 1, wherein before the light entering step, the beam in the specified wavelength range passes through a pinhole slit.

7. The method of claim 1, wherein:
    in the magnifying step, a magnification unit is used, and
    when changing the distance between the photodetector and the imaging lens, both the magnification unit and the photodetector move together maintaining a distance between the magnification unit and the photodetector.

8. The method of claim 1, further comprising an output step of outputting the obtained intensity variation.

9. A method for measuring optical characteristics of an imaging lens composed of a diffraction optical element, the method comprising:
    a light entering step of allowing a beam originated from a white light source and having a specified wavelength range to enter, through a pinhole slit, the imaging lens composed of the diffraction optical element;
    a magnifying step of magnifying, by using a magnification unit, a spot beam as a result of convergence of the beam by the imaging lens;
    a projecting step of projecting the magnified spot beam on a photodetector having a plurality of pixels;
    a measuring step of measuring intensity of the projected magnified spot beam by the photodetector while changing a distance between the photodetector and the imaging lens in a direction of an optical axis of the spot beam; and
    a profile obtaining step of obtaining an intensity variation of the projected magnified spot beam along the optical axis as a function of the distance, the intensity variation including at least two peaks corresponding to two different order diffraction lights.

10. The method of claim 9, wherein, when changing the distance between the photodetector and the imaging lens, both the magnification unit and the photodetector move together maintaining a distance between the magnification unit and the photodetector.

* * * * *